(12) United States Patent
Shin et al.

(10) Patent No.: US 10,307,910 B2
(45) Date of Patent: Jun. 4, 2019

(54) APPARATUS OF RECOGNIZING POSITION OF MOBILE ROBOT USING SEARCH BASED CORRELATIVE MATCHING AND METHOD THEREOF

(71) Applicant: YUJIN ROBOT CO., LTD., Seoul (KR)

(72) Inventors: Kyung Chul Shin, Seoul (KR); Seong Ju Park, Gunpo-si (KR); Jae Young Lee, Gunpo-si (KR)

(*) Notice: Subject to any disclaimer, the term of this patent is extended or adjusted under 35 U.S.C. 154(b) by 47 days.

(21) Appl. No.: 15/382,331

(22) Filed: Dec. 16, 2016

(65) Prior Publication Data

US 2017/0151674 A1 Jun. 1, 2017

Related U.S. Application Data

(63) Continuation of application No. PCT/KR2015/006154, filed on Jun. 17, 2015.

(30) Foreign Application Priority Data

Jun. 17, 2014 (KR) .................. 10-2014-0073708

(51) Int. Cl.
*G05B 15/00* (2006.01)
*G05B 19/00* (2006.01)
(Continued)

(52) U.S. Cl.
CPC ............. *B25J 9/1697* (2013.01); *B25J 9/16* (2013.01); *B25J 13/08* (2013.01); *B25J 19/023* (2013.01);
(Continued)

(58) Field of Classification Search
CPC ..... B25J 19/023; B25J 9/1697; G06K 9/4604; G06T 2207/10012; G06T 2207/20021;
(Continued)

(56) References Cited

U.S. PATENT DOCUMENTS

| 7,110,602 B2* | 9/2006 | Krause ................. G06K 9/0063 382/199 |
| 2006/0257048 A1* | 11/2006 | Lin ..................... G06K 9/00711 382/276 |

(Continued)

FOREIGN PATENT DOCUMENTS

| KR | 10-2003-0095492 A1 | 12/2003 |
| KR | 10-0834577 A1 | 6/2008 |

(Continued)

OTHER PUBLICATIONS

Ethan Eade and Tom Drummond, Edge landmarks in monocular SLAM, Image and Vision Computing, vol. 27, Issue 5, pp. 588-596, Apr. 2, 2009.

(Continued)

*Primary Examiner* — Harry Y Oh
(74) *Attorney, Agent, or Firm* — Jongkook Park

(57) ABSTRACT

Disclosed are an apparatus of recognizing a position of a mobile robot using search based correlative matching and a method thereof. An apparatus of recognizing a position of a mobile robot includes two wide angle cameras which obtain one pair of stereo images on a region of interest including a vertical direction and a horizontal direction in accordance with movement of a mobile robot; and a position recognizing unit which extracts an edge from the received stereo image, forms a virtual space using at least one key frame selected based on the extracted edge, and estimates the current position using the edge size which is calculated for the formed space.

20 Claims, 11 Drawing Sheets

(51) Int. Cl.
*B25J 9/16* (2006.01)
*G06T 7/73* (2017.01)
*G06T 7/11* (2017.01)
*G06T 7/174* (2017.01)
*B25J 19/02* (2006.01)
*G06K 9/46* (2006.01)
*B25J 13/08* (2006.01)
*G05D 1/02* (2006.01)
*G06K 9/00* (2006.01)
*G06T 7/13* (2017.01)
*H04N 13/239* (2018.01)

(52) U.S. Cl.
CPC ......... *G05D 1/0251* (2013.01); *G05D 1/0253* (2013.01); *G05D 1/0272* (2013.01); *G05D 1/0274* (2013.01); *G06K 9/00664* (2013.01); *G06K 9/4604* (2013.01); *G06K 9/4647* (2013.01); *G06T 7/11* (2017.01); *G06T 7/13* (2017.01); *G06T 7/174* (2017.01); *G06T 7/74* (2017.01); *H04N 13/239* (2018.05); *G06K 9/00201* (2013.01); *G06T 2207/10012* (2013.01); *G06T 2207/10021* (2013.01); *G06T 2207/20021* (2013.01); *G06T 2207/30244* (2013.01); *G06T 2207/30252* (2013.01); *Y10S 901/01* (2013.01)

(58) Field of Classification Search
CPC . G06T 2207/30252; G06T 7/11; G06T 7/174; G06T 7/74
USPC ......................................................... 700/259
See application file for complete search history.

(56) References Cited

U.S. PATENT DOCUMENTS

| | | | | |
|---|---|---|---|---|
| 2007/0276541 | A1* | 11/2007 | Sawaski | G05D 1/0246 700/253 |
| 2008/0205644 | A1* | 8/2008 | Lee | H04N 7/1675 380/210 |
| 2015/0015702 | A1* | 1/2015 | Yamaguchi | G06T 17/05 348/142 |
| 2015/0206023 | A1* | 7/2015 | Kochi | G01B 11/00 382/199 |
| 2016/0103437 | A1* | 4/2016 | Alfredsson | G05B 19/0425 700/83 |
| 2017/0181383 | A1* | 6/2017 | Shen | A01G 3/08 |

FOREIGN PATENT DOCUMENTS

| | | |
|---|---|---|
| KR | 10-2010-0081588 A1 | 7/2010 |
| KR | 10-2010-0119442 A1 | 11/2010 |
| KR | 10-2011-0011424 A1 | 2/2011 |
| KR | 10-2011-0047797 A1 | 5/2011 |
| KR | 10-2011-0097344 A1 | 8/2011 |
| KR | 10-2012-0070291 A1 | 6/2012 |
| KR | 10-2013-004674 A1 | 5/2013 |

OTHER PUBLICATIONS

John Canny, A Computational Approach to Edge Detection, IEEE Transactions on Pattern Analysis and Machine intelligence, vol. PAMI-8, No. 6 pp. 679-698, Nov. 1986.
S. Benhimane and E. Malis, Homography-based 2D Visual Tracking and Servoing, International Journal of Robotics Research archive vol. 26 Issue 7 pp. 661-676, Jul. 2007.
Michael Calonder, Vincent Lepetit, Christoph Strecha, and Pascal Fua, BRIEF: Binary Robust Independent Elementary Features, vol. 6314 of the series Lecture Notes in Computer Science pp. 778-792, 11th European Conference on Computer Vision, Heraklion, Crete, Greece, Sep. 5-11, 2010.
Christoph Strecha, Vincent Lepetit, Tomasz Trzcinski, Michael Calonder, Mustafa Özuysal and Pascal Fua, BRIEF: Computing a local binary descriptor very fast, vol. 34 Issue No. 07, Jul. 2012.
Wooyeon Jeong and Kyoung Mu Lee, CV-SLAM: a new ceiling vision-based SLAM technique, IEEE International Conference on Intelligent Robots and Systems, Aug. 2-6, 2005.
Georg Klein and David Murray, Parallel Tracking and Mapping for Small AR Workspaces, IEEE and ACM International Symposium on Mixed and Augmented Reality, Nov. 13-16, 2007.
Woo Yeon Jeong and Kyoung Mu Lee, Visual SLAM with Line and Corner Features, Proceedings of the 2006 IEEE/RSJ International Conference on Intelligent Robots and Systems Beijing China pp. 2570-2575, Oct. 9-15, 2006.

* cited by examiner

[FIG. 1]
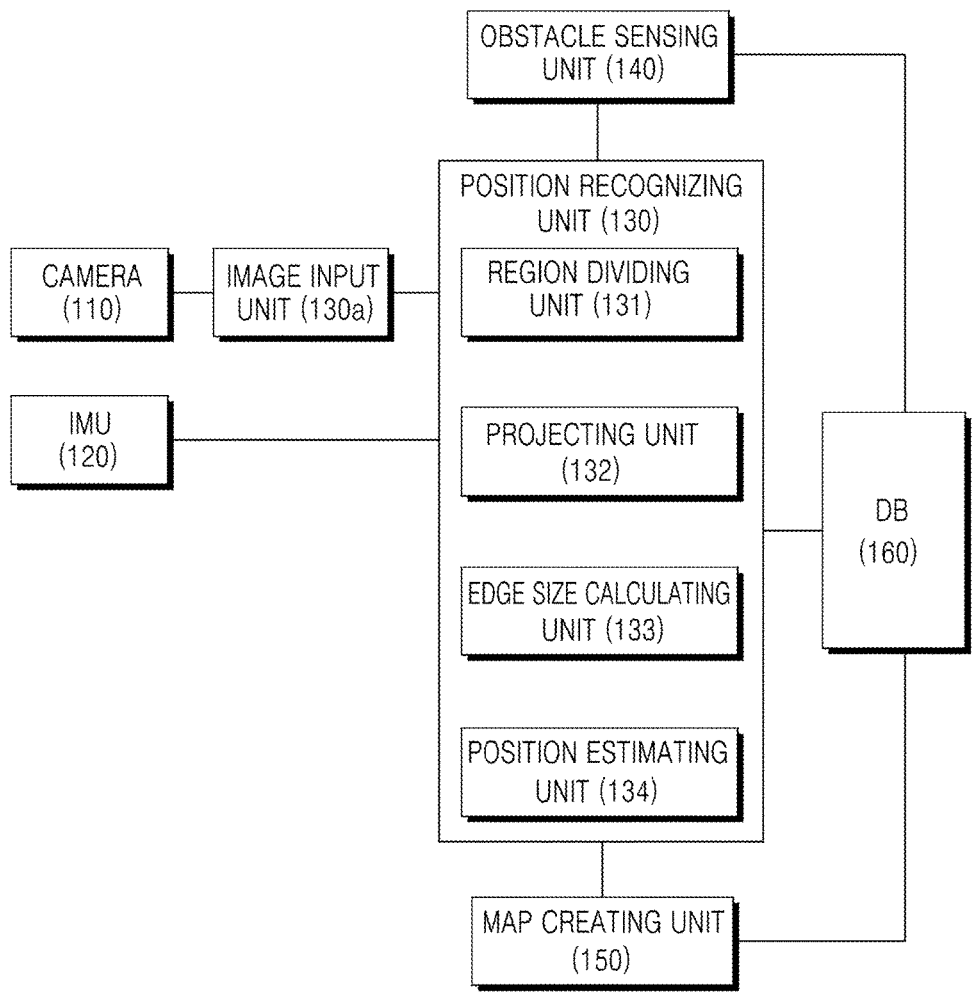

[FIG. 2]
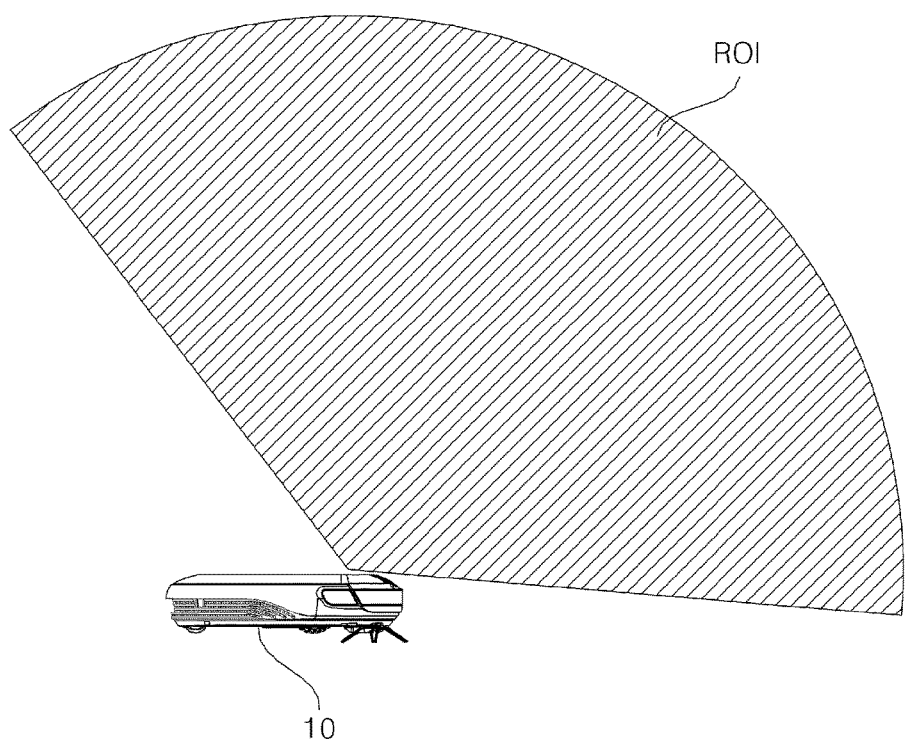

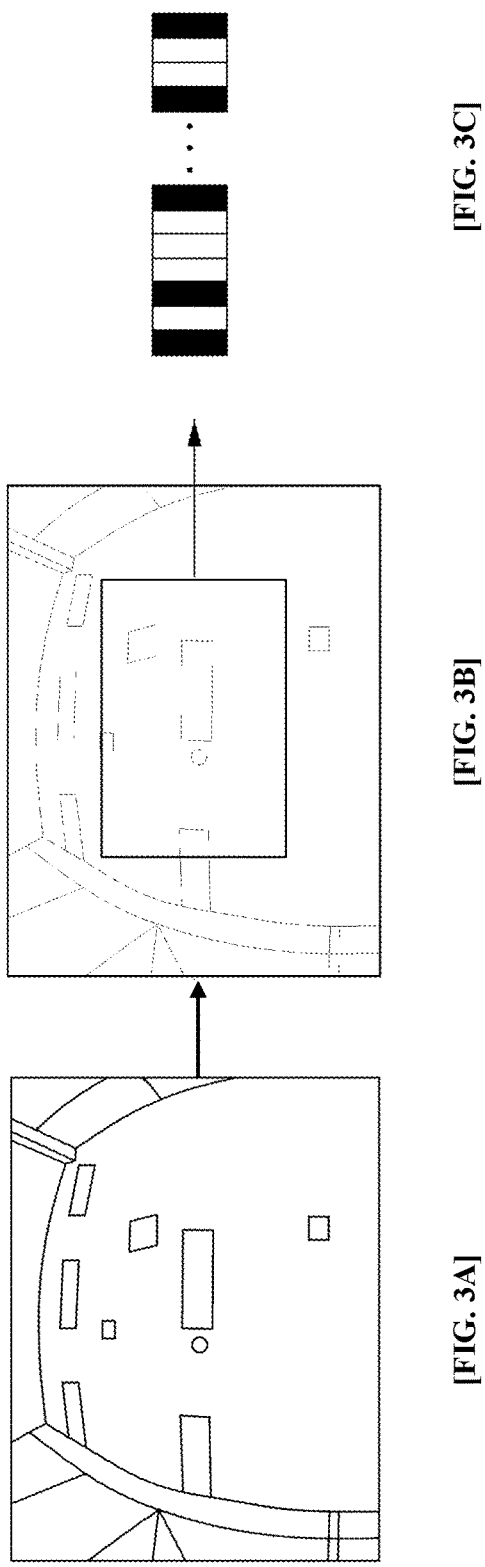

[FIG. 4]
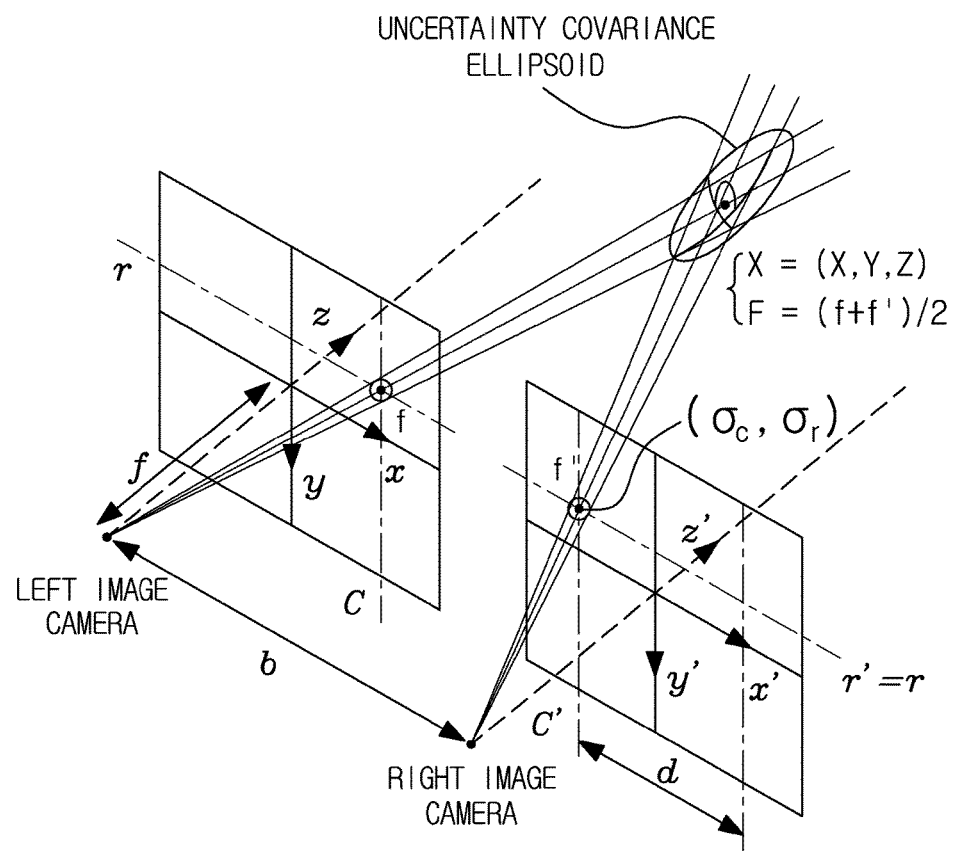

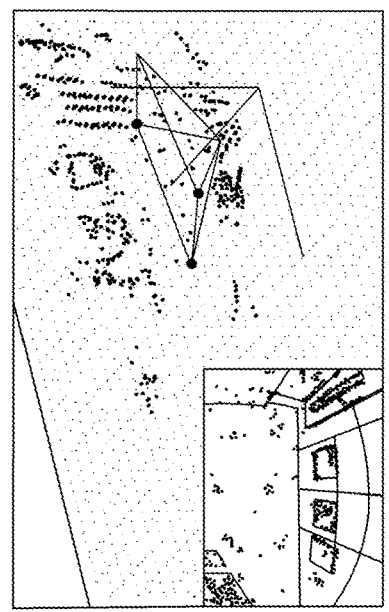
[FIG. 5D]
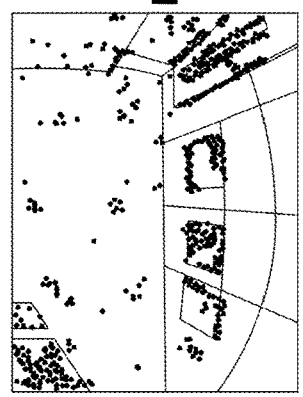
[FIG. 5C]
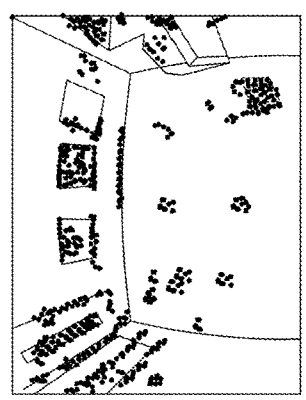
[FIG. 5A]
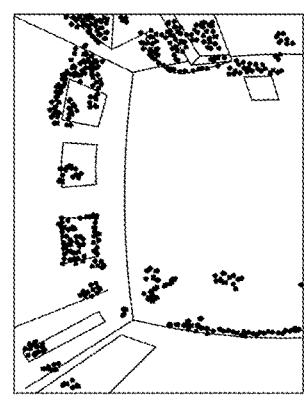
[FIG. 5B]

[FIG. 6A]
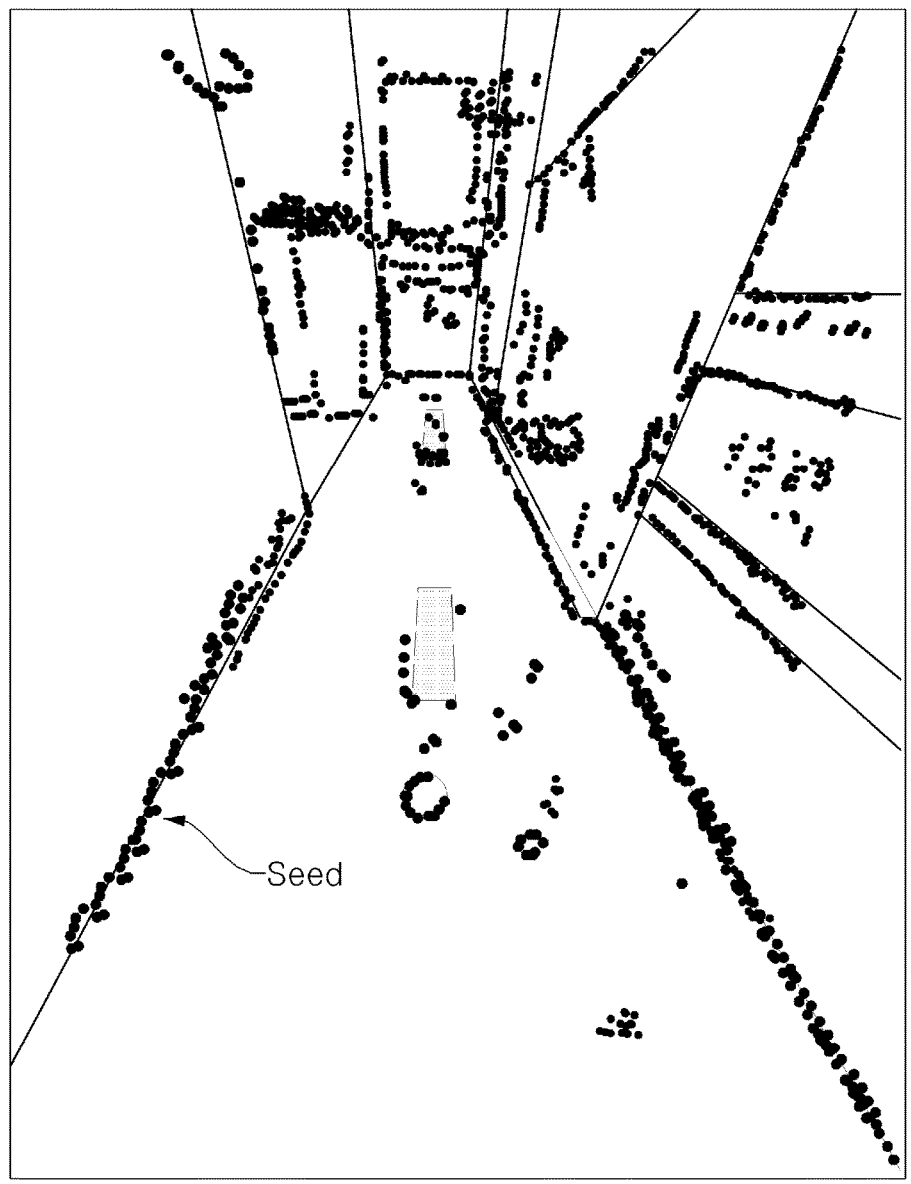

[FIG. 6B]
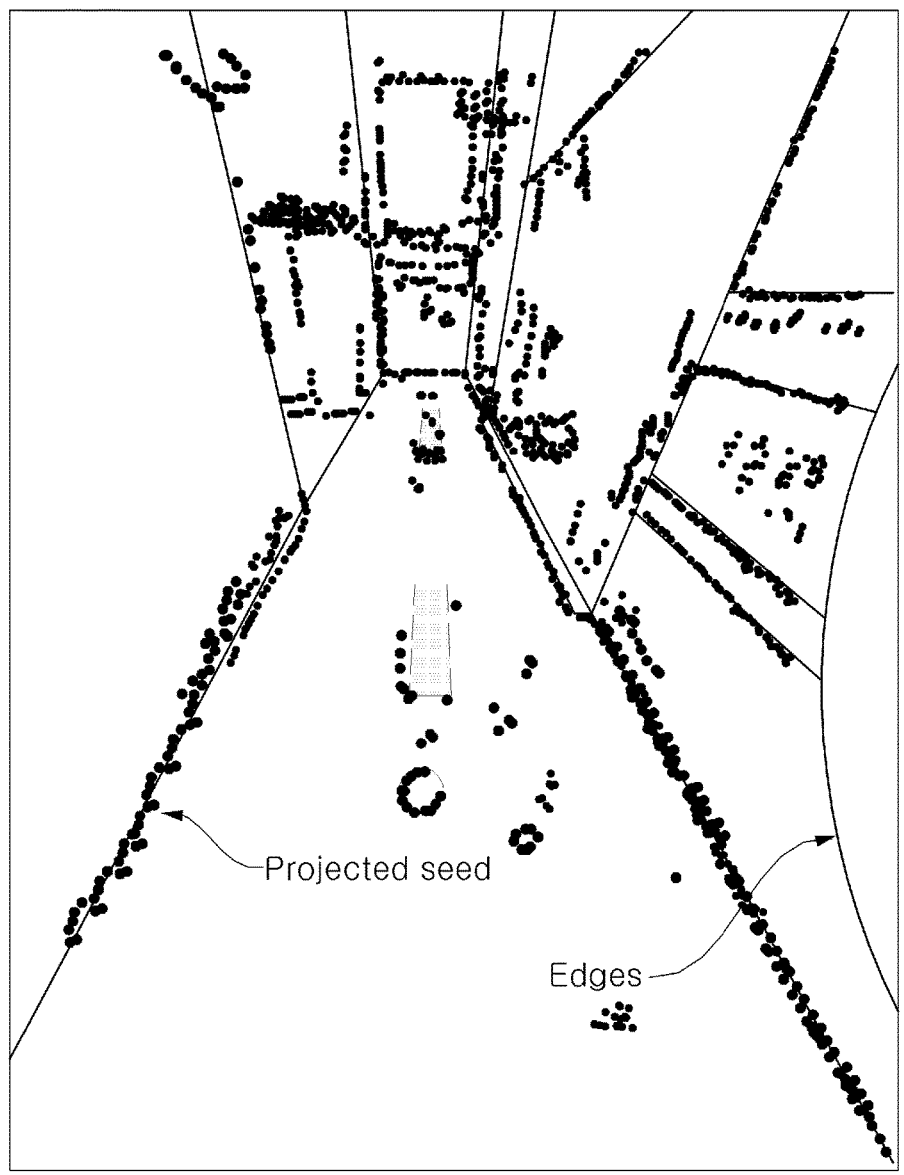

[FIG. 7]
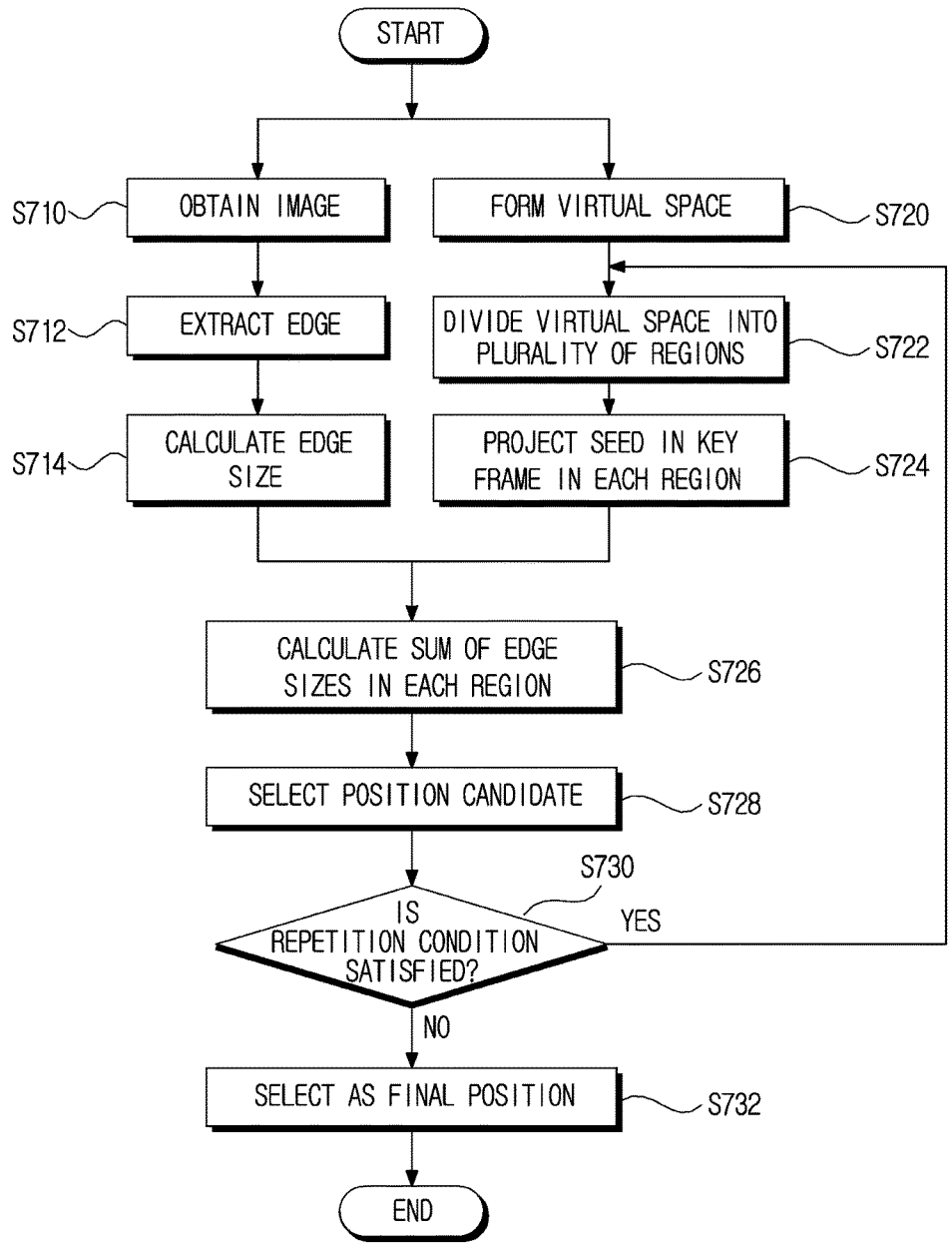

| A | B | C |
|---|---|---|
| D | E | F |
| G | H | I |

[FIG. 8A]

| e1 | e2 | e3 |
|---|---|---|
| e4 | e5 | e6 |
| e7 | e8 | e9 |

[FIG. 8B]

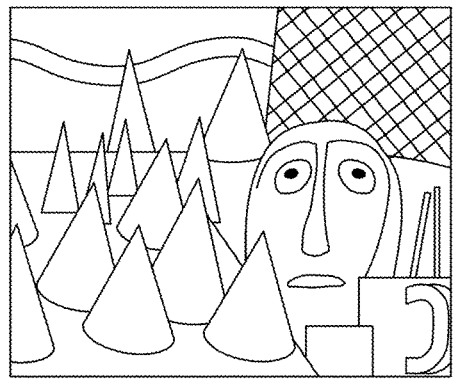
[FIG. 9A]
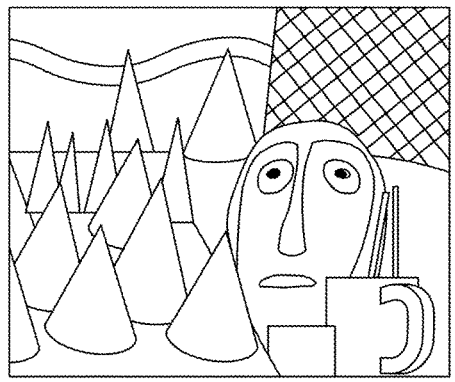
[FIG. 9B]
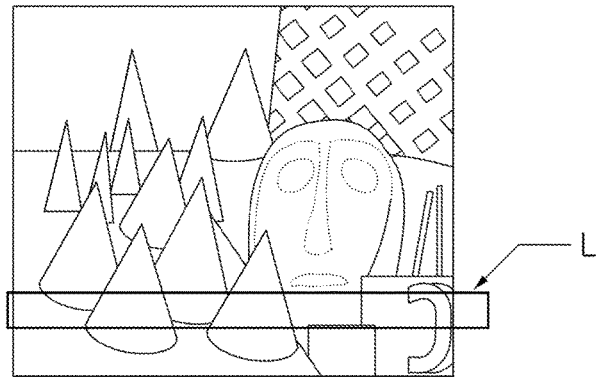
[FIG. 9C]

[FIG. 10]
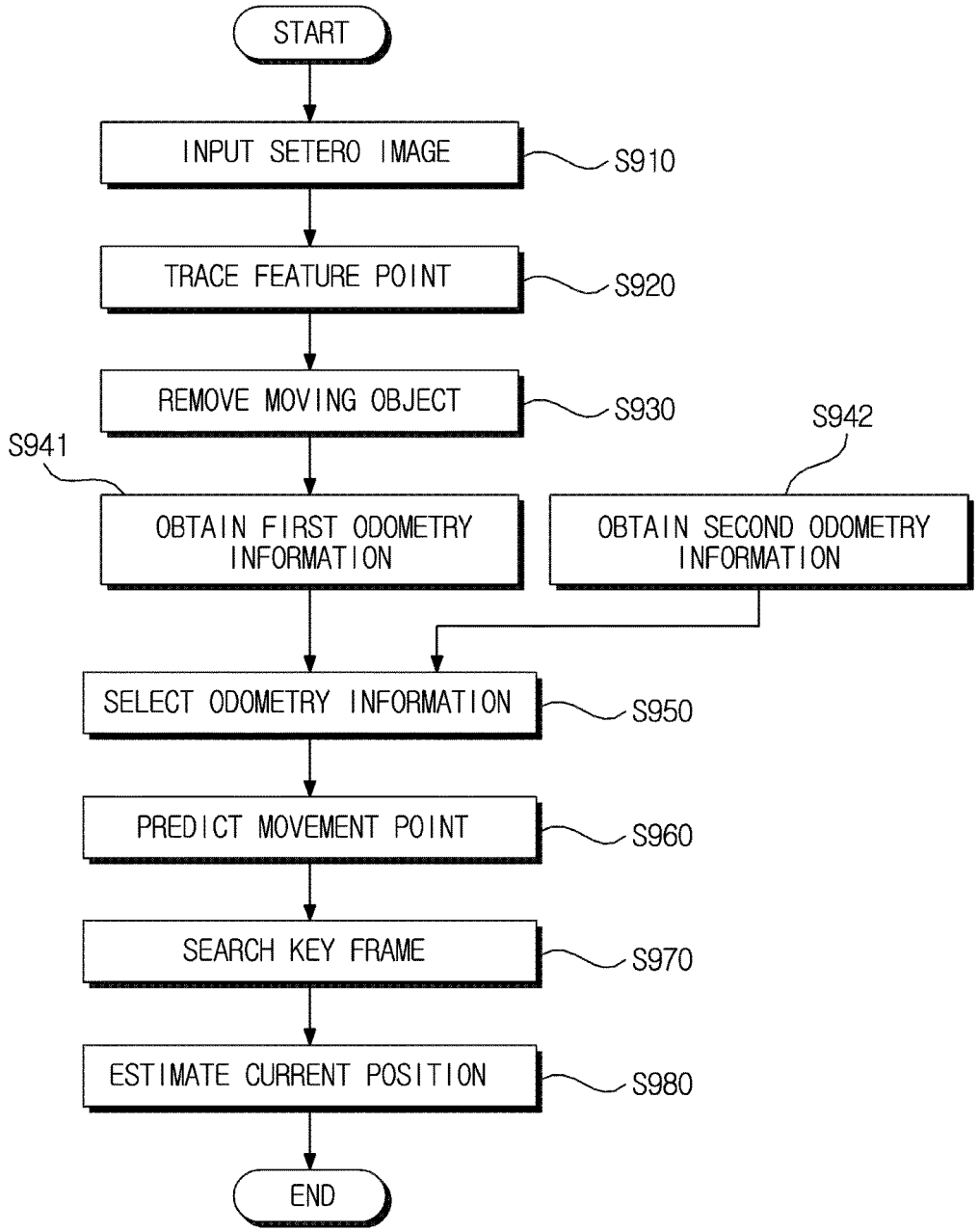

APPARATUS OF RECOGNIZING POSITION OF MOBILE ROBOT USING SEARCH BASED CORRELATIVE MATCHING AND METHOD THEREOF

CROSS-REFERENCE TO RELATED APPLICATIONS

This application is a continuation of International Application No. PCT/KR2015/006154, filed on Jun. 17, 2015, which claims priority to and the benefit of Korean Patent Application No. 10-2014-0073708 filed in the Korean Intellectual Property Office on Jun. 17, 2014, both of which are hereby incorporated by reference in their entireties.

TECHNICAL FIELD

The present invention relates to a position recognition method for a mobile robot, and more particularly, to an apparatus for recognizing the position of a mobile robot using search based correlative matching, and a method thereof.

BACKGROUND

Recently, according to the development of robot technology, mobile robots which set a route by themselves and move have been utilized. In order to allow such mobile robots to efficiently determine a position and move in a space, it is required to allow the mobile robot to recognize the position of the robot in the space while generating a map for the space wherein the robot moves.

Mobile robots are driven by dead reckoning navigation using a gyroscope and an encoder provided in a driving motor, and generate a map by analyzing images taken using a camera provided in the upper portion. In this case, when an error is incurred by the driving information from the gyroscope and the encoder, the image information obtained from the camera is utilized to correct the accumulated error.

However, location-based mobile robots which have been developed until now were developed under the assumption of movement on a two-dimensional plane using a monocular camera or a laser scanner. However, when a monocular camera is used, it is difficult to determine the distance to a feature point. Therefore, as the error of the dead reckoning navigation is increased, increasingly many errors may be included in the position recognizing result.

Further, since laser scanners are too expensive to apply to mobile robots, studies for utilizing a simultaneous localization and mapping (SLAM) technology, which recognizes a space and updates the location using a stereo camera, have been increasing in recent years.

Mobile robots based on SLAM technology perform the processes of extracting a corner feature point from an image, creating a map by restoring three-dimensional coordinates of the corner feature point, and recognizing a location.

It is very important for mobile robots to recognize a space and recognize their own position in the space. Since mobile robots which do not utilize the above-described technique have limited mobility and may provide a very limited type of service, the mobile robots are being developed competitively.

SUMMARY OF THE INVENTION

To solve the above-mentioned problems in the existing technology, the present invention has been made in an effort to provide an apparatus for recognizing the position of a mobile robot using search based correlative matching, which forms a virtual space using a selected key frame and divides the formed virtual space into a plurality of regions, after which it calculates an edge size in each of the plurality of divided regions to select the region having the largest sum of the calculated edge sizes as the final position, and a method thereof.

The present invention has been made in an effort to further provide an apparatus of recognizing the position of a mobile robot using a search based correlative matching method which estimates the position based on one type of odometry information selected from between the odometry information calculated by visual odometry, based on stereo imaging, and the odometry information calculated by internal odometry, based on inertial information, and a method thereof.

A further objective of the present invention is to provide an apparatus for recognizing the position of a mobile robot using a search based correlative matching method which extracts a predetermined number of horizontal lines from a stereo image to perform dense stereo alignment along the extracted horizontal lines, obtaining distance information to an obstacle as a result, and a method thereof.

However, the object of the present invention is not limited to the above description, and other objects which have not been mentioned above will be more apparent to those skilled in the art from a reading of the following description.

According to an aspect of the present invention, an apparatus for recognizing the position of a mobile robot may include: an image input unit which receives at least one pair of stereo images obtained by a mobile robot; and a position recognizing unit which extracts an edge from the received stereo images, forms a virtual space using at least one key frame selected based on the extracted edge, and estimates the position of the mobile robot using the edge size calculated for the formed virtual space.

Preferably, the position recognizing unit may divide the formed virtual space into a plurality of regions, calculate the edge size from the plurality of divided regions, and use the calculated edge to estimate the current position of the mobile robot. The apparatus may further include two cameras which obtain stereo images.

Preferably, the position recognizing unit may include: a region dividing unit, which forms a virtual space of a preconfigured range with respect to the given key frame and divides the formed virtual space into a plurality of regions; a projecting unit, which sequentially projects each seed of the applicable key frame onto the stereo images in each position in the plurality of divided regions; an edge size calculating unit, which calculates the edge size corresponding to the coordinates of each projected seed in the key frame; and a position estimating unit, which estimates the region having the largest sum of the edge sizes calculated in each of the plurality of regions to be the position of the mobile robot.

Preferably, the position recognizing unit may select the region having the largest sum of the edge sizes calculated in each of the plurality of regions as a position candidate, check whether it satisfies preconfigured repetition conditions for re-estimation of the position in the region of the selected candidate position, and estimate the selected position candidate to be the position of the mobile robot when the repetition conditions are found not to be satisfied as a result of the check.

Preferably, when the repetition conditions are found to be satisfied as a result of the check, the position recognizing unit may repeatedly perform the processes of dividing the region of the selected position candidate into a plurality of regions, and selecting the region having the largest sum of the edge sizes calculated in each of the plurality of divided regions as a position candidate.

Preferably, the repetition conditions may include whether the number of times the region has been devided has reached a preconfigured threshold value, or whether the variation in the sum of the calculated edge sizes is within a predetermined threshold value.

Preferably, the position recognizing unit may obtain the gradient of each pixel of an image containing the edge in a first axis direction and a second axis direction, calculate the magnitude of the gradient using the obtained gradients in the first axis direction and the second axis direction, and set the calculated magnitude of the gradient as the size of the edge.

Preferably, the first axis and the second axis may be different axes which are orthogonal to each other in a coordinate system of the plane of an image which includes the edge.

Preferably, the position recognizing unit may predict a movement point using the odometry information calculated based on the edge and estimate the current position using the predicted movement point and a key frame which is adjacent to the movement point.

Preferably, the position recognizing unit may utilize the odometry information calculated on the basis of the edge to predict the state information, and then employ the predicted state information and previously stored key frames to estimate the current location.

Preferably, the position recognizing unit may predict state information using one type of odometry information from among the first odometry information calculated based on the edge and the second odometry information calculated based on inertial information, after which it may estimate the current position using the predicted state information and the previously stored key frame.

Preferably, the position recognizing unit may select the first odometry information when the first odometry information satisfies the predetermined conditions and select the second odometry information when the first odometry information does not satisfy the predetermined conditions.

Preferably, the position recognizing unit may search for at least one key frame adjacent to the movement point among a previously stored key frame set based on the predicted movement point and, as a result, may estimate the current position of the mobile robot using at least one of the key frames searched.

According to another aspect of the present invention, a method of recognizing the position of a mobile robot may include: the step of receiving at least one pair of stereo images obtained by a mobile robot; and the step of extracting an edge from the received stereo image, forming a virtual space using at least one given key frame based on the extracted edge, and using the edge size calculated for the formed virtual space to estimate the position of the mobile robot.

Preferably, in the estimation step, the formed virtual space may be divided into a plurality of regions so that the edge size may be calculated from the plurality of divided regions, after which the current position of the mobile robot may be estimated using the calculated edge size.

Preferably, the estimation step may include forming a virtual space of a preconfigured range with respect to the given key frame and dividing the formed virtual space into a plurality of regions; sequentially projecting each seed in the key frame onto the stereo images in each position in the plurality of divided regions; calculating the edge size corresponding to the coordinates of each projected seed in the key frame; and setting the region having the largest sum of the edge sizes calculated in each of the plurality of regions as the position of the mobile robot.

Preferably, in the estimation step, the region having the largest sum of the edge sizes calculated in each of the plurality of regions may be selected as a position candidate, after which it may be checked to determine whether it satisfies the preconfigured repetition conditions for re-estimation of the position in the region of the selected position candidate, and finally, the selected position candidate may be estimated as the position of the mobile robot when the repetition conditions are found not to be satisfied as a result of the check.

Preferably, when the repetition conditions are found not to be satisfied as a result of the check, the estimation step may repeatedly perform division of the region of the selected position candidate into a plurality of regions and selection of the region having the largest sum of edge sizes calculated in each of the plurality of regions as a position candidate.

Preferably, the repetition conditions may include whether the number of times the region has been divided has reached a predetermined threshold value, or whether the variation in the sum of the calculated edge sizes is within a predetermined threshold value.

Preferably, in the above-mentioned estimation step, the gradient of each pixel of an image containing the edge may be obtained in a first axis direction and a second axis direction in order to calculate the magnitude of the gradient using the obtained gradients in the first axis direction and the second axis direction, after which the calculated magnitude of the gradient may be set as the size of the edge.

Preferably, in the above-mentioned estimation step, the state information may be predicted using the odometry information calculated on the basis of the edge, and the predicted state information and previously stored key frame may be used to predict the current position.

As described above, according to the present invention, a virtual space is formed using a selected key frame and the formed virtual space is divided into a plurality of regions, after which an edge size is calculated in each of the plurality of divided regions in order to select the region having the largest sum of the calculated edge sizes as the final position, thereby calculating the current position at a high speed.

Further, according to the present invention, the position is estimated based on one type of odometry information selected from between the odometry information calculated by visual odometry, based on stereo imaging, and the odometry information calculated by internal odometry, based on inertial information, thereby reducing the positional error incurred when the mobile robot is tilted or slides.

Further, according to the present invention, the problem of vulnerability to positional error incurred when the mobile robot is tilted or slides is solved, so that the position may be recognized stably.

Further, according to the present invention, a predetermined number of horizontal lines is extracted from a stereo image to perform dense stereo alignment along the extracted horizontal lines, and as a result, the distance information to an obstacle may be obtained, thereby allowing information on the distance to an obstacle to be obtained without attaching an expensive dedicated sensor for measuring distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating an apparatus for recognizing the position of a mobile robot, according to an exemplary embodiment of the present invention.

FIG. 2 is a view illustrating a region of interest of a wide angle camera, according to an exemplary embodiment of the present invention.

FIGS. 3A, 3B and 3C illustrating the space recognition process, according to an exemplary embodiment of the present invention.

FIG. 4 is a view illustrating uncertainty of a three-dimensional point, according to an exemplary embodiment of the present invention.

FIGS. 5A, 5B, 5C and 5D illustrating three-dimensional information of an edge, according to an exemplary embodiment of the present invention.

FIGS. 6A and 6B are views illustrating a position recognizing concept, according to an exemplary embodiment of the present invention.

FIG. 7 is a view illustrating a position recognition process, according to an exemplary embodiment of the present invention.

FIGS. 8A and 8B are views illustrating a position recognizing principle, according to an exemplary embodiment of the present invention.

FIGS. 9A, 9B and 9C are views illustrating the obstacle sensing process, according to an exemplary embodiment of the present invention.

FIG. 10 is a view illustrating a method of recognizing the position of a mobile robot, according to an exemplary embodiment of the present invention.

It should be understood that the appended drawings are not necessarily to scale, and present a somewhat simplified representation of various features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter, an apparatus for recognizing the position of a mobile robot using search based correlative matching and a method thereof, according to an exemplary embodiment of the present invention, will be described with reference to the accompanying drawings. The detailed explanation provided herein will be centered on parts which are required to understand the operation and effects of the present invention.

In the description of components of an exemplary embodiment, a component having the same name may be denoted by a different reference numeral in some drawings, but may also be denoted by the same reference numeral in other different drawings. However, even in this case, it does not mean that the component has different functions depending on the exemplary embodiment or that the components have the same function in the different exemplary embodiments, but rather the function of each component shall be determined based on the description of the components in the corresponding exemplary embodiment.

Specifically, the present invention suggests a new method in which a virtual space is formed using a selected key frame and the formed virtual space is then divided into a plurality of regions, after which the edge size in each of the plurality of divided regions is calculated in order to select the region possessing the largest sum of the calculated edge sizes as the final position.

Further, according to an exemplary embodiment, the position is estimated based on one type of odometry information selected from between the odometry information calculated by visual odometry, based on stereo imaging, and the odometry information calculated by internal odometry, based on inertial information, and a preconfigured number of horizontal lines is extracted from a stereo image for performance of dense stereo alignment along the extracted horizontal lines so that distance information to an obstacle may be obtained as a result.

FIG. 1 is a view illustrating an apparatus of recognizing the position of a mobile robot, according to an exemplary embodiment of the present invention.

The mobile robot position recognizing apparatus, according to an exemplary embodiment of the present invention, may include an image input unit 130a and a position recognizing unit 130. The mobile robot position recognizing apparatus, according to the exemplary embodiment of the present invention, may include at least one of a camera 110, an inertial measurement unit (IMU) 120, a position recognizing unit 130, an obstacle sensing unit 140, a map creating unit 150, and a database (DB) 160, if necessary.

The image input unit 130a receives at least a pair of stereo images obtained from the mobile robot. The stereo images may be images obtained using two cameras provided with the mobile robot.

Two cameras 110 may be provided to obtain a pair of stereo images, that is, a left image and a right image. Here, two cameras indicates that two different lenses are used to obtain an image at two different viewpoints. Further, the case in which two lenses are provided in one image obtaining device to obtain two images is also the same meaning. In this case, the camera 110 may be mounted to have a predetermined area of interest. Here, the region of interest may be a region to be photographed using the camera 110 provided within the mobile robot.

The camera 110 may preferably be a wide angle camera. A wide angle camera is a camera which takes images using a wide angle lens having an angle of view which is wider than that of a general camera lens. It is desirable to use a wide angle camera for the mobile robot to obtain a broader surrounding image. For example, the wide angle camera may be a camera using a fish eye lens. Here, in the wide angle camera, the angle of view of the wide angle lens may be 60 to 270 degrees, for example. In the wide angle camera, according to the exemplary embodiment of the present invention, the angle of view is not limited to the range of the above-described angle of view, and a camera using a lens having various ranges of angles of view may also be employed.

FIG. 2 is a view illustrating a region of interest of a wide angle camera, according to an exemplary embodiment of the present invention.

As illustrated in FIG. 2, according to the exemplary embodiment of the present invention, unlike existing mobile robots in which the camera is directed either toward the ceiling or the front side, the two cameras 110 mounted on the mobile robot 10 in the present invention employ wide angle lenses which can see both the ceiling and the front side, so that in the mobile robot, both the ceiling and the front side may be set as regions of interest (ROI).

For example, the camera may take images of regions in both a horizontal direction and a vertical direction using the wide angle lens.

According to the exemplary embodiment of the present invention, both the ceiling and the front side are set as regions of interest using the camera 110 mounted as described above, so that the feature points may be easily secured. Further, the position may now be recognized even in places where it is difficult to find feature points, and obstacles located at the front side may also be recognized.

The IMU 120 measures inertial information of the mobile robot, for example, information such as the position, pose, and the like.

The position recognizing unit 130 extracts edges from the received stereo images. In this exemplary embodiment of the present invention, as described above, the edges may be extracted using approximated difference of Gaussian (ADoG) or a gradient.

First, a method of extracting an edge using a gradient will be described.

The position recognizing unit 130 obtains gradients in a first axis direction and a second axis direction from each pixel of the received stereo image input and extracts the edge based on the gradients in the direction of the first axis and the direction of the second axis.

The first axis and the second axis may be different axes which are orthogonal to each other in the coordinate system of a plane of a stereo image. Preferably, the first axis and the second axis may be the x-axis and y-axis of an orthogonal coordinate system formed by the x-axis and the y-axis. Hereinafter, the operation of the position recognizing unit 130 utilizing the x-axis and the y-axis as the first axis and the second axis, respectively, will be described. Hereinafter, the operation of the position recognizing unit 130 which has been described with reference to the x-axis and the y-axis may also be applied to the first axis and the second axis in the same way.

Next, the position recognizing unit 130 calculates the magnitude, $I_m$, of the gradient using gradients $I_x$ and $I_y$ in the x-axis direction and the y-axis direction, respectively. The magnitude $I_m$ may be calculated by the following Equation: $I_m = (I_x^2 + I_y^2)^{1/2}$.

Next, the position recognizing unit 130 calculates the angle, $I_\theta$, of the gradient using gradients $I_x$ and $I_y$ in the x-axis direction and the y-axis direction, respectively. The angle $I_\theta$ may be calculated by the following Equation: $I_\theta = a\tan 2(I_x, I_y)$. Here, a tan 2(y,x) is an arctangent calculating function having two input variables and, for example, may be calculated using the following equation:

$$\text{atan2}(y, x) = \begin{cases} \arctan\frac{y}{x} & x > 0 \\ \arctan\frac{y}{x} + \pi & y \geq 0, x < 0 \\ \arctan\frac{y}{x} - \pi & y < 0, x < 0 \\ +\frac{\pi}{2} & y > 0, x = 0 \\ -\frac{\pi}{2} & y < 0, x = 0 \\ \text{underfined} & y = 0, x = 0 \end{cases}$$

Next, the position recognizing unit 130 finally extracts the image of an edge through a non-maximal suppression (NMS) process based on the calculated magnitude of the gradient $I_m$ and the angle of the gradient $I_\theta$ of each pixel.

That is, the position recognizing unit 130 selects the pixel having the largest gradient magnitude $I_m$ from among adjacent pixels having the same angle with respect to the angle of the gradient $I_\theta$ of the pixel as a the maximal value (maxima).

This process is applied to all pixels to extract an edge formed by one line.

Thereafter, the position recognizing unit 130 extends the region to a preconfigured number of pixels adjacent to the pixel located on the line which forms the edge, and may select a pixel in the extended region which has a size that is equal to or greater than a preconfigured threshold value as an edge.

For example, the position recognizing unit 130 extends the region to two pixels which neighbor the pixel most closely, and selects all pixels from among pixels in the extended region which have a size that is equal to or greater than the preconfigured threshold value as an edge.

This process is applied to all pixels to extract a final edge image, which is formed by a plurality of lines extended from the edge formed by one line through NMS.

Here, the NMS (non-maximal suppression) process may use, for example, the non-maximal suppression technique introduced in "Canny, J., A Computational Approach To Edge Detection, IEEE Trans. Pattern Analysis and Machine Intelligence, 8(6):679 to 698, 1986." or may also use other various types of non-maximal suppression techniques.

Next, a method of extracting an edge using an approximated difference of Gaussian (ADoG) will be described.

The present invention suggests a new method in which an integral image is obtained from an original image, after which a box smoothing process is performed on the integral image to obtain a box smoothed image as a result of the box smoothing. The original image is then subtracted from the box smoothing image to finally extract an edge image. In the present invention, the method of extracting an edge by the box smoothing process is referred to as an approximated difference of Gaussian (ADoG).

Here, the position recognizing unit 130 performs a smoothing processing on the received stereo image to obtain a smoothed image as a result of the smoothing. The position recognizing unit 130 then compares the smoothed image and the original stereo image to extract an edge, and may estimate the current position of the mobile robot based on the extracted edge.

Here, the position recognizing unit 130 obtains an integral image from the stereo image, performs a box smoothing process on the obtained integral image to calculate a box smoothed image as a result of the box smoothing process, and compares the calculated box smoothed image and the original stereo image so that the edge may be extracted as a result of the comparison.

To this end, the position recognizing unit 130 may include an integral image obtaining unit, which obtains an integral image from the stereo image; a box smoothing image calculating unit, which performs a box smoothing process on the obtained integral image to calculate a box smoothed image as a result of the box smoothing process; and an edge extracting unit, which compares the calculated box smoothed image and the original stereo image to extract the edge as a result of the comparison. The position recognizing unit may further include a position estimating unit. Here, the position estimating unit may perform the operation of estimating the position of the mobile robot using the edge extracted by the position recognizing unit 130, which will be described in detail below.

The integral image obtaining unit of the position recognizing unit 130, according to the exemplary embodiment of the present invention, may obtain an integral image "IntegImage" from the stereo image "orgImage" by the following Equation:

$$IntegImage(x, y) = \sum_{y'=0}^{y} \sum_{x'=0}^{x} orgImage(x', y')$$

Here, (x, y) indicates a coordinate of the integral image and (x',y') indicates a coordinate of the stereo image Next, the smoothing image calculating unit of the position recognizing unit 130 performs a box blurring process or a box smoothing process on the obtained integral image to calculate a box smoothed image as a result of the box smoothing.

In this case, the box smoothing may be considered as a preprocessing process for removing the noise or extracting contour information, similarly to Gaussian smoothing.

In the present invention, the box smoothing processing has been described as an example, but the present invention is not limited thereto, and various other smoothing processing techniques, such as Gaussian smoothing, may also be applied.

Next, the edge extracting unit of the position recognizing unit 130 extracts an edge image "$I_{edge}$" by subtracting the original image, that is, the stereo image "$I_{source}$" from the box smoothed image "$I_{box\_blur}$" which may be calculated using the following equation: $I_{edge}=I_{box\_blur}-I_{source}$.

The final edge image may be extracted through this processes of integration, smoothing, and subtraction.

The position recognizing unit 130 receives stereo image input from the camera 110 and recognizes a given space based on the received stereo image whenever the mobile robot moves a predetermined distance.

FIG. 3 is a view illustrating the space recognizing process, according to an exemplary embodiment of the present invention.

As illustrated in FIG. 3, the position recognizing unit 130 recognizes the given space whenever the mobile robot moves a predetermined distance, or whenever a new key frame is generated, and creates a database thereof.

The position recognizing unit 130 may reduce the received stereo image to be of a preconfigured size for blurring. Here, it is desirable that the preconfigured size may be one eighth the size of the received stereo image. Referring to FIG. 3, the position recognizing unit 130 reduces the received stereo image (a) and generates a blurred image (b).

The position recognizing unit 130 encodes the blurred stereo image using a binary robust independent elementary features (BRIEF) binary descriptor to generate binary data as a result of the encoding. Here, the BRIEF binary descriptor may be encoded using the method introduced in {BRIEF}: Computing a Local Binary Descriptor Very Fast, M. Calonder, V. Lepetit, M. Ozuysal, T. Trzcinski, C. Strecha, and P. Fua IEEE Transactions on Pattern Analysis and Machine Intelligence 2012. Here, the binary data may be generated to be 32 bytes, for example. FIG. 3C is a reference view illustrating the BRIEF binary descriptor.

The position recognizing unit 130 compares the binary data so generated with the data indicating the absolute position of the mobile robot in the previously stored key frame, and as a result of the comparison, may recognize the current position using the absolute position when the absolute position falls within a predetermined range.

The reason why the BRIEF binary descriptor is used to recognize a space in the exemplary embodiment of the present invention is because the calculation speed is much faster than that of established descriptors which are used in the related art, such as SIFT or SURF.

The position recognizing unit 130 receives stereo image input from the camera 110 to obtain the first type of odometry information through visual odometry based on the input stereo image, and receives inertial information from the IMU 120 to obtain the second type of odometry information through internal odometry, based on the input inertial information. The odometry information to be obtained by the present invention includes a movement distance and a movement angle. Here, the movement angle refers to an angle with respect to a predetermined direction.

In this case, the position recognizing unit 130 extracts a feature point from the stereo image and traces the extracted feature point to obtain the odometry information using the traced feature point. The position recognizing unit 131 uses one of the pair of obtained stereo images, generally the left stereo image.

Generally, the feature point which is extracted during the preprocessing process is a corner. However, it is impossible to obtain a sufficient amount of feature points in regions where there is no texture, such as in a hallway or a large office space.

In order to solve the above-mentioned problem, the position recognizing unit 130 performs stereo matching on the edge. That is, the position recognizing unit 130 extracts an edge from the stereo image and performs sparse stereo matching on the extracted edge. Here, sparse stereo matching is a concept which is distinguished from dense stereo matching. Sparse stereo matching is a matching method which focuses more on roughly and quickly matching stereo images, rather than on calculating exact matching results. Therefore, various established methods of the related art for adjusting the matching interval or adjusting the search range for the matching may be used.

FIG. 4 is a view illustrating the uncertainty of a three-dimensional point, according to an exemplary embodiment of the present invention.

As illustrated in FIG. 4, the position recognizing unit 130 sets uncertainty σ according to the depth value obtained as a result of stereo matching and stores the uncertainty σ in the DB. In the case of wide angle cameras, the resolution is low because the focal length is very short, so that the reliability of the obtained depth value drops. Therefore, an update is performed later.

The uncertainty of the three-dimensional point obtained using two wide angle cameras is represented by Equation 1.

[Equation 1]

$$\Sigma = \begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix} =$$

-continued $$\begin{pmatrix} \frac{b^2\sigma_c^2}{d^2}+\frac{b^2(c-c_0)\sigma_d^2}{d^4} & \frac{(c-c_0)b^2\sigma_d^2(r-r_0)}{d^4} & \frac{(c-c_0)b^2\sigma_d^2 f}{d^4} \\ \frac{(c-c_0)b^2\sigma_d^2(r-r_0)}{d^4} & \frac{b^2\sigma_r^2}{d^2}+\frac{b^2(r-r_0)\sigma_d^2}{d^4} & \frac{(r-r_0)b^2\sigma_d^2 f}{d^4} \\ \frac{(c-c_0)b^2\sigma_d^2 f}{d^4} & \frac{(r-r_0)b^2\sigma_d^2 f}{d^4} & \frac{f^2 b^2\sigma_d^2}{d^4} \end{pmatrix}$$

Here, $$\begin{pmatrix} \sigma_X^2 & \sigma_{XY} & \sigma_{XZ} \\ \sigma_{XY} & \sigma_Y^2 & \sigma_{YZ} \\ \sigma_{XY} & \sigma_{YZ} & \sigma_Z^2 \end{pmatrix}$$

indicates an uncertainty covariance ellipsoid, b indicates the distance between the cameras, x, y, and z indicate the coordinate system of the left imaging camera, x', y', and z' indicate the coordinate system of the right imaging camera, (c, r) and (c', r') indicate the coordinates of matching pixels in the left camera and the right camera, f and f' indicate focal distances of the left camera and the right camera, $\sigma_r$ and $\sigma_c$ represent the uncertainty when the feature point is extracted, as axes of the coordinate system, and $r_0$ and $c_0$ represent the optical axis of the camera by a camera coordinate system. Further, d is the difference generated when the feature point is projected to the left side and the right side, and is generally referred to as disparity. $\sigma_d$ represents the uncertainty of the measured depth value.

At a time when it is determined that the mobile robot has moved a predetermined distance, pixels which are stored in the key frame are projected onto the current image to find the most similar pixel, with which the depth value is updated. The update may be performed by applying a general Bayesian rule.

In this case, while the mobile robot is in motion, erroneous information is input due to various variables, specifically, moving obstacles or blocking, thus there may exist outliers among the depth values obtained based on erroneous information.

In order to solve the above-mentioned problem, when the obtained depth value is within 1Σ, the variable "no_success" is increased by one, and when the obtained depth value is larger than 1Σ, the variable "no_failure" is increased by one. Thereafter, only when the reliability no_success/(no_success+no_failure) is larger than a specific value is the depth value used to recognize the position.

The Bayesian rule which is used to update the depth value is represented by Equation 2.

$$\mu=[\sigma_{Z_2}^2/(\sigma_{Z_1}^2+\sigma_{Z_2}^2)]\mu_{Z_1}+[\sigma_{Z_1}^2/(\sigma_{Z_1}^2+\sigma_{Z_2}^2)]\mu_{Z_2}$$

$$1/\sigma^2=(1/\sigma_{Z_1}^2)+(1/\sigma_{Z_2}^2) \quad \text{[Equation 2]}$$

μ is the average depth value, $\mu_{z1}$ is the average of the previously obtained depth values, $\mu_{z2}$ is the average of the currently measured depth values, σ is the uncertainty of μ, $\sigma_{z1}$ is the uncertainty of $\mu_{z1}$, and $\sigma_{z2}$ is the uncertainty of $\mu_{z2}$.

Here, although the updating process of the depth value z has been described, the x and y-values vary depending on z. Therefore, x, y, and z are all updated so that the position may be determined, and the updated x, y, and z are used so that the position of the camera may also be determined inversely.

FIG. 5 is a view illustrating the three-dimensional information of an edge, according to an exemplary embodiment of the present invention. FIG. 5A is an image representing a depth value which is projected to the left imaging camera, FIG. 5B is an image representing a depth value which is projected to the right imaging camera, FIG. 5C is an image representing a depth value obtained through the updating process, and FIG. 5D is an image representing projection to a matching point and a depth value.

As illustrated in FIG. 5, it is understood that when the depth value is repeatedly updated, the three-dimensional information on the edge may be consistently obtained.

The information from the IMU is very important in situations where it is difficult to recognize the environment through the camera. However, in low-priced IMUs, the bias varies significantly, or estimation of the bias is very difficult. In order to solve said problem, the bias is obtained by stopping the robot for a moment and taking an average. In this case, however, there are disadvantages in that the user may think that the mobile robot is unintelligent, and the working speed is also lowered.

In order to solve the above-mentioned problems, the position recognizing unit 130 updates the bias even during movement.

It is assumed that $\theta_g$ is the angular velocity obtained by a gyro sensor and $\theta_c$ is the angular velocity obtained by wide angle stereo vision. Error may be incurred between these angular velocities due to bias while the mobile robot is in motion. The error, $\theta_c$, may be defined by Equation 3.

$$\theta_e=\theta_g-\theta_c \quad \text{[Equation 3]}$$

In this case, $\theta_e$ may be a bias. When speedy rotation or disturbance occurs, the bias is updated by applying the Bayesian rule as represented by Equation 4.

If, $|\theta|<\text{threshold}_{moving}, \mu_n=\theta_e, \sigma^2=1$ deg/sec×0.1 deg/sec  [Equation 4]

$\mu_n$ indicates the error of the bias, and σ indicates the uncertainty of $\mu_n$. When the mobile robot may stop during movement, the bias is updated as represented by Equation 5.

If, $|\theta|<\text{threshold}_{stop}, \eta_n=\theta_e, \sigma^2 0.1$ deg/sec×0.1 deg/sec  [Equation 5]

Since the bias is corrected in real time by the above-described update process, even when the camera cannot be used momentarily, the odometry information obtained through use of the IMU may maintain a predetermined level of accuracy using the optimal bias.

The position recognizing unit 130 selects either the first type of odometry information or the second type of odometry information and uses the selected information as a basis for estimating the current state information of the mobile robot, for example, the pose or position. That is, the position recognizing unit 130 accumulates the odometry information which is periodically measured during movement, specifically, the movement distance and the movement angle, to predict the relative position and angle from the movement point calculated from the accumulation results, using the point at which movement starts.

The position recognizing unit 130 extracts an edge from the received stereo image input, forms a virtual space using at least one key frame selected based on the extracted edge, and estimates the position of the mobile robot using the edge size calculated for the formed virtual space. In this case, the position recognizing unit 130 divides the formed virtual space into a plurality of divided regions and calculates the edge size from the plurality of divided regions, after which it then uses the calculated edge size to enable estimation of the current position of the mobile robot.

As was illustrated in FIG. 1, the position recognizing unit 130 includes a region dividing unit 131 which forms the virtual space of a preconfigured range with respect to the given key frame and divides the formed virtual space into a plurality of regions, a projecting unit 132 which sequentially projects each seed of the applicable key frame onto the images in each position in the plurality of divided regions, an edge size calculating unit 133 which calculates the edge size corresponding to the coordinates of each projected seed in the key frame, and a position estimating unit 134 which estimates the region having the largest sum of the edge sizes calculated in each of the plurality of regions to be the position of the mobile robot.

Here, the position recognizing unit 130 performs stereo matching between the stereo images using the edge extracted from the stereo image in order to calculate the disparity value or the depth value of the pixels included in the stereo image, and may then estimate the current position of the mobile robot using the calculated disparity value or depth value. That is, the stereo matching between stereo images is performed on the pixels corresponding to the edges extracted from each stereo image for calculation of the disparity value or the depth value, and the current position of the mobile robot may be estimated using the disparity value or the depth value, as well as the optical axis information of the camera, the focal distance information, and the information on the distance between the stereo cameras. That is, when the disparity or the depth value in a specific pixel of the stereo image and specification information (the optical axis, focal distance, and distance between cameras) of the camera which obtained the stereo image are known, the three-dimensional coordinates for that pixel may be restored, and the position of the mobile robot may be determined relatively through the three-dimensional coordinates of the pixels included in the stereo image.

For example, when the optical axes u0 and v0 are known, the focal distance f, the distance b between cameras are known, and the disparity d is known through stereo matching, the restored three-dimensional coordinates (x, y, z) are $$\left(\frac{b(u-u0)}{d}, \frac{b(v-v0)}{d}, \frac{fb}{d}\right).$$

u and v indicate the coordinates of a pixel in the stereo image.

Further, as the method of figuring out the position of the object from which the stereo image was obtained using the depth value of the stereo image, various established techniques of the related art may be employed.

Here, a seed may be set for a pixel selected from the edge of the image. Further, the seed may be set for pixels for which the three-dimensional coordinates are restored as described above. Here, the seed may include at least one of an image coordinate, a disparity or a depth, a variance of disparity or a variance of depth, a pixel value, and a gradient direction and magnitude.

The position recognizing unit 130 may estimate the current position using at least one adjacent key frame among the previously stored key frame set based on the predicted state information. That is, the position recognizing unit 130 may estimate the current position using at least one key frame which is adjacent to the predicted movement point.

Here, the key frame may be a set of seeds indicating pixels selected from the edge of the stereo image, which contain periodically measured information regarding the state of the mobile robot, and the relationship between the key frame, K, and the seed, s, is represented by Equation 6.

$$K=\{s_0, s_1, \ldots, s_n\} \quad \text{[Equation 6]}$$

In this case, the position recognition of the mobile robot may be estimated using a registered key frame, and may be considered as the process of calculating how much the mobile robot has moved with respect to the given key frame.

That is, when the rotation and the movement of one camera with respect to the key frame are defined by R and T, respectively, the projection to the current camera of a coordinate, Pi, restored through the seed is represented by Equation 7.

$$p=prj(R,T,P_i) \quad \text{[Equation 7]}$$

Here, p indicates the projection coordinates of the seed to the camera.

The projection coordinates of the seed calculated by Equation 7 are gathered onto an edge in the image, which is finally enabled through having an appropriate R and T.

FIGS. 6A and 6B are views illustrating the position recognition concept, according to an exemplary embodiment of the present invention.

FIG. 6A illustrates a key frame which contains color-coded seeds in an image, and FIG. 6B illustrates an edge in an image, and the seeds projected there.

That is, as the position recognition result becomes more accurate, the projection of the coordinates restored through all seeds to the current camera are gathered onto the edge. In the exemplary embodiment of the present invention, the position is recognized using the characteristic of the projection coordinates being gathered at the edge. Such a position recognizing method is referred to as search based correlative matching.

FIG. 7 is a view illustrating the position recognition process, according to an exemplary embodiment of the present invention.

As illustrated in FIG. 7, the position recognizing unit 130 obtains an image at the present point in time in step S710, extracts an edge from the obtained image in step S712, and calculates the magnitude of the extracted edge in step S714.

Here, the position recognizing unit 130 calculates the gradient in each pixel contained in the image including the edge in the direction of a first axis and in the direction of a second axis, after which it uses the obtained gradients in the first axis direction and the second axis direction to calculate the magnitude of the gradient, and finally, sets the calculated magnitude of the gradient as the size of the edge.

Here, the first axis and the second axis may be different axes which are orthogonal to each other in the coordinate system of the image plane including the edge. That is, the first axis and the second axis may be different axes which are orthogonal to each other in the coordinate system of a stereo image plane. Preferably, the first axis and the second axis may be the x-axis and y-axis of the orthogonal coordinate system formed by the x-axis and the y-axis.

In this case, the position recognizing unit 130 obtains the gradients from each pixel of the image in the x-axis and y-axis directions, $I_x$ and $I_y$, and calculates a magnitude $I_m$ using the obtained gradients, $I_x$ and $I_y$, in the x-axis direction and the y-axis direction, as represented in Equation 8.

$$I_m=(I_x^2+I_y^2)^{1/2} \quad \text{[Equation 8]}$$

Next, the position recognizing unit 130 projects each seed from the selected key frame onto an image while changing the position in the virtual space so that the current position may be estimated as the position in the virtual space when the projected seeds are located closest to the edge.

Here, the virtual space may be a floor in the space wherein the mobile robot moves.

That is, the position recognizing unit 130 projects each seed in the selected key frame and forms a virtual space having a predetermined range with respect to the coordinates of a position corresponding to the key frame in step S720, divides the formed virtual space into a plurality of regions in step S722, and sequentially projects each seed in the key frame onto the image in each position of the plurality of divided regions in step S724.

That is, the position recognizing unit 130 projects the seeds in the key frame onto the image while changing R and T. Here, when R and T are changed, the position moves in the virtual space.

Figures 8A, 8B:
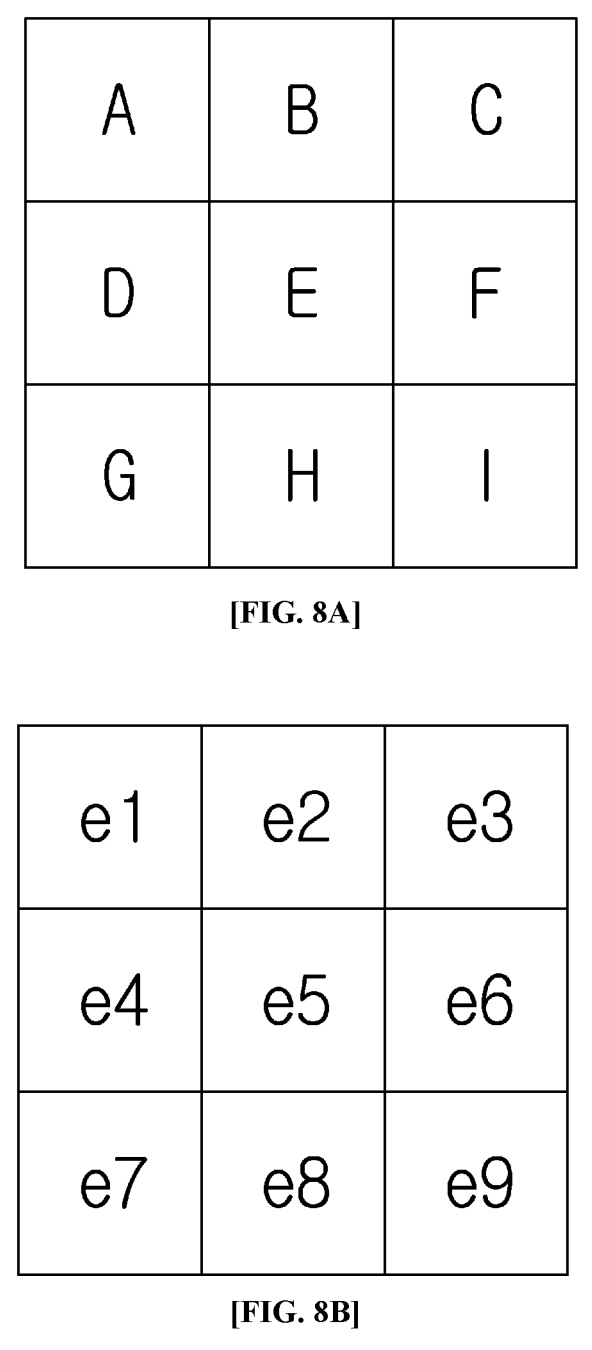

FIGS. 8A and 8B are views illustrating the position recognition principle, according to an exemplary embodiment of the present invention.

Referring to FIG. 8A, the position recognizing unit 130 forms a virtual space which is divided into nine regions, A, B, C, D, E, F, G, H, and I, with respect to the coordinates corresponding to the key frame. Here, the position recognizing unit 130 locates the coordinates corresponding to the key frame in region E and forms a virtual space including regions which are adjacent to the located region E and which have the same area.

The position recognizing unit 130 projects the seeds in the key frame onto a stereo image for each of the nine regions, A, B, C, D, E, F, G, H, and I, and calculates the edge sizes corresponding to the coordinates of each projected seed in order to calculate the sum of the calculated edge sizes in step S726.

In this case, the edge size corresponding to the coordinates of the projected seeds may be obtained from the edge of the coordinates in the image.

The position recognizing unit 130 selects the region possessing the largest sum of the edge sizes, calculated as described above, as a candidate for the current position in step S728, and the position candidate is selected using Equation 9, as follows.

$$\operatorname*{argmax}_{R,T} \sum_{i=0}^{n} f(prj(R, T, P_i)) \qquad \text{[Equation 9]}$$

Here, f( ) is a cost function, and is a function which returns the size of the edge in the image.

In this case, when one position candidate is selected, the position recognizing unit 130 checks whether the preconfigured repetition conditions are satisfied in order to estimate the position in the region of the selected position candidate in step S730.

Here, the repetition conditions include conditions such as whether the number of times the region has been divided has reached a preconfigured threshold value, or whether the variation of the sum of the calculated edge sizes is within a predetermined threshold value.

For example, when the number of times of dividing the region is one, which has not reached the preconfigured threshold value of two, the position recognizing unit 130 performs additional position estimation in the region of the selected position candidate.

When the repetition conditions are found to be satisfied as a result of the check, the position recognizing unit 130 divides the region of the selected position candidate into a plurality of regions and sequentially projects the seeds in the key frame onto an image in each position of the plurality of divided regions.

When the repetition conditions are found not to be satisfied as a result of the check, the position recognizing unit 130 selects the selected position candidate as the final position in step S732 and ends the subsequent processes.

Referring to FIG. 8B, the position recognizing unit 130 divides the first sub block E, which was selected as a position candidate, into nine second sub blocks: e1, e2, e3, e4, e5, e6, e7, e8, and e9.

The position recognizing unit 130 projects each seed in the key frame onto the image for each of the nine second sub blocks, e1, e2, e3, e4, e5, e6, e7, e8, and e9, and calculates the edge size corresponding to the coordinates of each projected seed in order to calculate the sum of the calculated edge sizes.

The position recognizing unit 130 selects the second sub block e5, which has the largest sum of the calculated edge sizes, as the current position candidate and then checks whether the repetition conditions are satisfied. When the result of the check is satisfactory, the position recognizing unit 130 selects the second sub block as the final position, thus allowing high-speed estimation of the position of the mobile robot.

As described above, according to the exemplary embodiment of the present invention, the virtual space is formed using a given key frame selected based on the predicted state information, and the formed virtual space is then divided into a plurality of regions having equal size. When any one of the plurality of divided regions becomes selected, the selected region is again divided into a plurality of regions, and the above processes are repeatedly performed.

The obstacle sensing unit 140 receives stereo image input from the wide angle camera 110 and extracts a predetermined number of horizontal lines from the received stereo image. Here, the predetermined number is at least two, and preferably three.

The obstacle sensing unit 140 performs dense stereo matching along the extracted horizontal lines to obtain information on the distance to an obstacle as a result. Here, the dense stereo matching is a concept which is distinguished from sparse stereo matching, and is a matching method for calculating exact matching results when matching is performed between stereo images. To this end, various established methods of the related art for adjusting the matching interval or adjusting the search range for the matching may be used.

FIG. 9 is a view illustrating the obstacle sensing process, according to an exemplary embodiment of the present invention.

As illustrated in FIG. 9, the obstacle sensing unit 140 performs highly dense stereo matching based on the received left and right stereo images as illustrated in FIGS. 9A and 9B, and as a result may calculate the depth value. Here, in the image of FIG. 9C, the depth value calculated as described above is represented in grayscale. Further, FIG. 9C illustrates a linear region, L, which is used to sense the obstacle. Since the depth values for the entire region cannot be calculated by a mobile robot mounted with a small-sized processor, in the exemplary embodiment of the present invention, the depth values are extracted only from a partial region.

The map creating unit 150 is provided with the current position information estimated by the position recognizing unit 130, reconstructs a pose graph based on the provided position information, and may update the previously stored key frame set based on the reconstructed pose graph. A map may be configured by the set of key frames.

The DB 160 stores the key frame set generated in accordance with movement of the mobile robot, that is, the map.

A method of recognizing the position of a mobile robot, according to another exemplary embodiment of the present invention, may include the step of receiving at least one pair of stereo images obtained from a mobile robot, and the steps of extracting an edge from the received stereo image input, forming a virtual space using at least one given key frame based on the extracted edge, and estimating the position of the mobile robot using the edge size calculated for the formed virtual space. The method of recognizing the position of a mobile robot may operate in the same manner as the apparatus for recognizing the position of a mobile robot described above. Therefore, redundant parts will be omitted or described simply.

In this case, in the estimation step, the formed virtual space is divided into a plurality of regions, the edge size is calculated from the plurality of divided regions, and the current position of the mobile robot may then be estimated using the calculated edge size.

As illustrated in FIG. 1, the estimation includes: the step of forming a virtual space having a predetermined range with respect to the given key frame and dividing the formed virtual space into a plurality of regions; the step of sequentially projecting each seed in the key frame into each position of the plurality of divided regions; the step of calculating the edge size corresponding to the coordinates of each seed in the projected key frame; and the step of setting the region having the largest sum of the edge sizes calculated in the plurality of regions to be the position of the mobile robot.

In the estimation step, the region having the largest sum of the calculated edge sizes in each of the plurality of regions is selected as a position candidate, a check is performed to determine whether the predetermined repetition conditions are satisfied to re-estimate the position in the region of the selected position candidate, and when the repetition conditions are found not to be satisfied as a result of the check, the selected position candidate is estimated to be the position of the mobile robot.

In the estimation step, when the repetition conditions are found to be satisfied as a result of the check, the processes of dividing the region of the selected position candidate into a plurality of regions and then selecting the region having the largest sum of the edge sizes calculated in the plurality of regions as the position of the mobile robot may be repeatedly performed.

Here, in the estimation step, the gradient in each pixel of an image containing the edge is obtained in a first axis direction and a second axis direction, the magnitude of the gradient is calculated using the obtained gradients in the first axis direction and the second axis direction, and the calculated magnitude of the gradient is then set as the size of the edge.

In the estimation step, the state information is predicted using odometry information calculated based on the edge, and the current position is then estimated using the predicted state information and a given key frame which is adjacent to the movement point.

FIG. 10 is a view illustrating a method of recognizing a position of a mobile robot, according to an exemplary embodiment of the present invention.

As illustrated in FIG. 10, when an apparatus for recognizing the position of the mobile robot (hereinafter referred to as a position recognizing apparatus), according to an exemplary embodiment of the present invention, receives stereo image input from the wide angle camera in step S910, it extracts a feature point from the input stereo image and continuously traces the extracted feature points by frame in step S920.

Next, the position recognizing apparatus may remove moving objects from the stereo image in step S930.

For example, the position recognizing apparatus compares the current frame and the last n-th frame, and as a result of the comparison, removes inconsistent features which may be determined to be moving objects.

Next, the position recognizing apparatus performs visual odometry based on the traced feature points to obtain the first type of odometry information as the result in step S940, and obtains the second type of odometry information through internal odometry, based on inertial information, in step S942.

Next, the position recognizing apparatus selects one type of odometry information from between the first odometry information and second odometry information in step S950, and uses the selected odometry information and pose information to predict the state information in step S960.

In this case, the position recognizing apparatus selects the first odometry information when the first odometry information satisfies the predetermined conditions, and selects the second odometry information when the first odometry information does not satisfy the predetermined conditions.

Here, determining whether the predetermined conditions are satisfied refers to determining whether the odometry information, for example, the rate of change of the position information, is within the preconfigured threshold value.

Next, based on the predicted state information, the position recognizing apparatus searches at least one adjacent key frame from among the previously stored key frame set in step S970, and may estimate the current position using at least one of the key frames searched in step S980.

That is, the position recognizing apparatus repeatedly performs the processes of forming a virtual space using the searched key frame, dividing the formed virtual space into a plurality of regions, projecting the seeds in a key frame onto an image in each of the plurality of divided regions to calculate the edge size corresponding to the seeds as a result of the projection, selecting the area having the largest sum of the calculated edge sizes as the position candidate, and further dividing the selected region into a plurality of regions to select the position candidate, thereby determining the final position.

In this case, the position may be estimated more accurately as the number of adjacent key frames increases.

The position recognizing apparatus, according to the exemplary embodiment, may be applied to autonomous cleaning robots or service robots. For example, cleaning robots autonomously move in indoor environments or outdoor environments. While operating, the cleaning robot meets various obstacles such as walls, guardrails, desks, or furniture, and the autonomous cleaning robot uses its own position and the position of obstacles in the cleaning area to determine a driving route, along which it moves. According to the exemplary embodiment, the autonomous cleaning robot includes a stereo camera, specifically, a wide angle stereo camera, as an image capturing unit to obtain external images. Through the external environmental information so-acquired, especially the feature points related to edges, the autonomous cleaning robot is able to estimate its own position, determine the driving route, and thus move.

Specifically, in the case of cleaning robots which autonomously move based on simultaneous localization and mapbuilding (SLAM), the exemplary embodiment may be used for the robot to estimate its own position on the constructed lattice map, to estimate the position of obstacles, to determine a movement route to avoid collision with the obstacles using the estimated position relationships, and to determine an optimal route.

For example, the odometry information may be information obtained from a wheel mounted in the mobile robot or from rotary encoders in a legged joint. The state information, such as movement distance of the mobile robot or number of rotations of the wheel, may be calculated using the odometry information. Further, the space where the mobile robot is currently located may be understood through the state information, so that the odometry information may be used to determine the key frame during image processing.

The position recognition method, according to the exemplary embodiment of the present invention, may be implemented as computer readable software, and the software may be executed in a processor mounted in an autonomous cleaning robot.

Even though all components of the exemplary embodiment may be combined as one component or their operations may be combined, the present invention is not limited to the exemplary embodiment. In other words, if it is within the scope or purpose of the present invention, one or more of all of the components may be selectively combined for operation. Further, all of the components may be implemented as one independent hardware, but a part or all of the components may be selectively combined for implementation as a computer program which includes a program module that performs a part or all of the functions combined in one or plural hardwares. Further, such a computer program may be stored in a computer readable media such as a USB memory drive, a CD disk, or flash memory to be read and executed by a computer for implementation of the exemplary embodiment of the present invention. The storage media of the computer program may include media such as magnetic recording media, optical recording media, and carrier wave media.

The exemplary embodiments of the present invention which have been described above are examples, and it is obvious to those skilled in the art that various changes or modifications may be made without departing from the spirit and scope of the present invention. Therefore, the exemplary embodiments of the present invention are provided for illustrative purposes only, and are not intended to limit the technical spirit of the present invention, and the scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A mobile robot comprising:
   a camera system;
   at least one processor; and
   a non-transitory computer-readable medium storing instructions that, when executed by the at least one processor, cause the mobile robot to
      capture, by the camera system, image data of an object,
      generate at least one pair of stereo images from the image data,
      extract an edge from the at least one pair of stereo images,
      form a virtual space using at least one key frame selected based on the extracted edge,
      calculate an edge size for the virtual space, and
      estimate a position of the mobile robot using the edge size.

2. The mobile robot of claim 1, wherein the non-transitory computer-readable medium further stores instructions that, when executed by the at least one processor, cause the mobile robot to divide the virtual space into a plurality of regions and calculate the edge size from the plurality of regions.

3. The mobile robot of claim 1, wherein the camera system includes first and second cameras.

4. The mobile robot of claim 2, wherein the non-transitory computer-readable medium further stores instructions that, when executed by the at least one processor, cause the mobile robot to:
   divide the virtual space into the plurality of regions;
   sequentially project each of a plurality of seeds in the key frame onto the at least one pair of stereo images in each of the plurality of divided regions;
   calculate the edge size in accordance with a coordinate of each of the plurality of seeds in the key frame; and
   estimate which of the plurality of regions has a largest edge sizes as the position of the mobile robot.

5. The mobile robot of claim 2, wherein the non-transitory computer-readable medium further stores instructions that, when executed by the at least one processor, cause the mobile robot to select which of the plurality of regions has a largest edge sizes, check whether to satisfy a predetermined repetition condition to re-estimate the position in the region of the selected position candidate, and estimate the selected position candidate as the position of the mobile robot when the repetition condition is not satisfied as the checking result.

6. The mobile robot of claim 5, wherein the non-transitory computer-readable medium further stores instructions that, when executed by the at least one processor, cause the mobile robot to:
   divide the region of the selected position candidate into the plurality of regions when the repetition condition is satisfied as the checking result; and
   select a region having the largest sum of the edge sizes calculated in each of the plurality of divided regions as a position candidate.

7. The mobile robot of claim 5, wherein the repetition condition includes whether the number of times of dividing the region reaches a predetermined threshold value or whether a variation on the sum of the calculated edge sizes is within a predetermined threshold value.

8. The mobile robot of claim 2, wherein the non-transitory computer-readable medium further stores instructions that, when executed by the at least one processor, cause the mobile robot to obtain a gradient in each pixel of an image including the edge in a first axis direction and a second axis direction, calculate a magnitude of the gradient using the calculated gradient in the first axis direction and the second axis direction, and set the calculated magnitude of the gradient as a size of the edge.

9. The mobile robot of claim 8, wherein the first axis and the second axis are orthogonal to each other in a coordinate system of an image plane including the edge.

10. The mobile robot of claim 1, wherein the non-transitory computer-readable medium further stores instructions that, when executed by the at least one processor, cause the mobile robot to predict a movement point using odometry information calculated based on the edge and estimate the position of the mobile robot using the predicted movement point and a key frame that is adjacent to the movement point.

11. The mobile robot of claim 1, wherein the non-transitory computer-readable medium further stores instructions that, when executed by the at least one processor, cause the mobile robot to predict a movement point using one of first odometry information calculated based on the edge and second odometry information calculated based on inertia information and estimate the position of the mobile robot using the predicted movement point and a key frame that is adjacent to the movement point.

12. The mobile robot of claim 11, wherein the non-transitory computer-readable medium further stores instructions that, when executed by the at least one processor, cause the mobile robot to select the first odometry information when the first odometry information satisfies the predetermined condition and select the second odometry information when the first odometry information does not satisfy the predetermined condition.

13. The mobile robot of claim 11, wherein the non-transitory computer-readable medium further stores instructions that, when executed by the at least one processor, cause the mobile robot to search for at least one adjacent key frame from among a previously stored key frame set based on the predicted state information and estimate the position of the mobile robot using the at least one adjacent key frame.

14. The mobile robot of claim 1, wherein the non-transitory computer-readable medium further stores instructions that, when executed by the at least one processor, cause the mobile robot to extract the edge by either:
obtaining gradients in a first axis direction and a second axis direction from each pixel of the received stereo image to extract the edge based on the gradients in the first axis direction and the second axis direction, or
performing smoothing processing on the received stereo image and obtaining a smoothing image as the smoothing result and comparing the obtained smoothing image and the stereo image.

15. A non-transitory computer-readable medium storing instructions that, when executed by a computing apparatus cause the computing apparatus to:
receive at least one pair of stereo images from a camera system of a mobile robot;
extract an edge from the at least one pair of stereo images;
form a virtual space using at least one key frame selected based on the extracted edge;
calculate an edge size for the virtual space; and
estimate a position of the mobile robot using the edge size.

16. The non-transitory computer-readable medium of claim 15, wherein the instructions, when executed by the computing apparatus, further cause the computing apparatus to divide the virtual space into a plurality of regions and calculate the edge size from the plurality of divided regions.

17. The non-transitory computer-readable medium of claim 16, wherein the estimating includes:
forming the virtual space having a predetermined region with respect to the key frame;
sequentially projecting each of a plurality of seeds in the key frame onto the stereo images in each of the plurality of regions;
calculating the edge size in accordance with a coordinate of each projected seed in the key frame; and
setting a region having the largest edge sizes calculated in each of the plurality of regions as the position of the mobile robot.

18. The non-transitory computer-readable medium of claim 16, wherein in the estimating, a region having the largest sum of the edge sizes calculated in each of the plurality of regions is selected as a position candidate, it is checked whether to satisfy a predetermined repetition condition to re-estimate the position in the region of the selected position candidate, and the selected position candidate is estimated as the position of the mobile robot when the repetition condition is not satisfied as the checking result.

19. The non-transitory computer-readable medium of claim 18, wherein the estimating includes repeatedly performing;
dividing the region of the selected position candidate into the plurality of regions when the repetition condition is satisfied as the checking result; and
selecting a region having the largest sum of the edge sizes calculated in each of the plurality of regions as the position.

20. The non-transitory computer-readable medium of claim 18, wherein the repetition condition includes whether the number of times of dividing the region reaches a predetermined threshold value or whether a variation on the sum of the calculated edge sizes is within a predetermined threshold value.

* * * * *